United States Patent [19]

Yamazaki et al.

[11] Patent Number: 4,978,203

[45] Date of Patent: Dec. 18, 1990

[54] LIQUID CRYSTAL DEVICE WITH AN APPARENT HYSTERESIS

[75] Inventors: Shunpei Yamazaki, Tokyo; Takashi Inujima, Atsugi; Toshiji Hamatani, Atsugi; Toshimitsu Konuma, Atsugi; Mitsunori Sakama, Hiratsuka; Ippei Kobayashi, Atsugi; Toshiharu Yamaguchi, Zama, all of Japan

[73] Assignee: Semiconductor Energy Laboratory Co., Ltd., Atsugi, Japan

[21] Appl. No.: 295,008

[22] Filed: Jan. 9, 1989

Related U.S. Application Data

[63] Continuation of Ser. No. 775, Jan. 6, 1987, abandoned.

[30] Foreign Application Priority Data

Jan. 7, 1986 [JP] Japan ................................. 61-1152

[51] Int. Cl.⁵ ............................................... G02F 1/13
[52] U.S. Cl. ............................. 350/339 R; 350/333; 350/336; 350/350 S
[58] Field of Search ............... 350/332, 333, 334, 336, 350/339 R, 340, 341, 350 S; 340/765, 784

[56] References Cited

U.S. PATENT DOCUMENTS

| | | | |
|---|---|---|---|
| 3,725,899 | 4/1973 | Greubel | 350/339 R |
| 3,730,607 | 5/1973 | Grabmaier et al. | 350/339 R |
| 3,864,021 | 2/1975 | Katagori et al. | 350/341 |
| 4,021,798 | 5/1977 | Kojima et al. | 350/336 |
| 4,040,720 | 8/1977 | York | 350/333 |
| 4,474,432 | 10/1984 | Takamatsu et al. | 350/339 R |
| 4,494,824 | 1/1985 | Nakamura et al. | 350/339 R |
| 4,555,953 | 12/1985 | Dario et al. | 73/862.04 |
| 4,790,631 | 12/1988 | Yamazaki | 350/350 S |

FOREIGN PATENT DOCUMENTS 0155795  12/1979  Japan ............................ 350/339 R

OTHER PUBLICATIONS

M. Francombe–"Ferroelectric Films and Their Device Application" Thin Solid Films–Elsevier Sequoia S. A. Lausanne–1972–pp. 413–433.
S. Wu–"A New Ferroelectric . . . Semiconductor Transistor" pp. 499–504–IEEE Transactions on Electron Devices–vol. 21, No. 8–1974.

*Primary Examiner*—Stanley D. Miller
*Assistant Examiner*—Tai V. Duong
*Attorney, Agent, or Firm*—Sixbey, Friedman, Leedom & Ferguson

[57] ABSTRACT

An improved liquid crystal device is shown. The device comprises a pair of substrates, a liquid crystal layer disposed inbetween and a pair of electrodes formed on the opposed insides of the substrate for applying an electric field on the liquid crystal layer. Further a dielectric film is formed on a inside of the substrate of the device. In response to an electric field applied to the liquid crystal layer, an electric charge is accumulated on the dielectric film to enable the device to exhibit apparent coersive electric field.

7 Claims, 1 Drawing Sheet

LIQUID CRYSTAL DEVICE WITH AN APPARENT HYSTERESIS

This application is a continuation of Ser. No. 07/000,775, filed 1/6/87, now abandoned.

BACKGROUND OF THE INVENTION

In prior art, a liquid crystal device is comprised of a pair of substrates provided with a pair of electrodes on the insides thereof respectively and a pair of oriented films symmetrically provided on the opposed insides of the electrodes.

On the other hand, it is most impotant to have a sufficiently large coersive electric field Ec (threshold field) of liquid crystal, for active device structures of a liquid crystal device in which nonlinear elements are arranged in a matrix or a row. Under application of an electric field lower than the Ec, liquid crystal holds its initial state (transparent for example), but when applied with an electric field equal to or stronger than the Ec the liquid crystal is quickly reversed its state (opaque for example). Although an Ec exists both positive (Ec+) and negative (Ec−), the two are not necessary coincident in absolute value.

Such an Ec is faint in smectic liquid crystal, especially in chiral smectic C liquid crystal, so that the performance of a device using the liquid crystal is largely depend on the field strength and the pulse width of an applied pulsed electric field. Because of this, prior art employs for matrix display the existing method known as "AC bias method". Also in prior art a rewriting with a positive field is done by once applying a negative pulsed field and then applying a positive pulsed field which has the be finely controlled in strength and in time.

The bias method, however, requires a somewhat complicated peripheral circuit. In order to simplify the peripheral circuit, it is very important factor that liquid crystal employed has a steady and certain coercive electric field. In prior art some liquid crystal devices have been made with a rather certain coercive field by compromising the frequency characteristics or other performances.

SUMMARY OF THE INVENTION

It is therefore an object of the invention to provide a liquid crystal device with an apparent large coersive electric field.

It is another object of the invention to provide a liquid crystal device capable of exhibiting a steady hysteresis loop.

BRIEF DESCRIPTION OF THE INVENTION

DETAILED DESCRIPTION OF THE INVENTION

Figure 1:
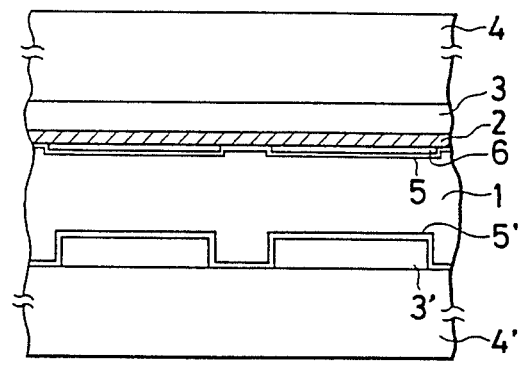
FIG. 1 is a cross section view showing an embodiment of the invention.

Referring to FIG. 1, a liquid crystal device according to the invention is illustrated. Between a pair of transparent substrates 4 is a liquid crystal layer 1 such as a twistic nematic, super twistic nematic, or, desirably a ferroelectric liquid crystal. electrode strips 3 and 3' are orthogonally arranged on the opposed insides of substrates 1. On the electrode 3 are a dielectric film 2 and a floating electrode 6 so that a capacitance is formed between the floating electrode 6 and the electrode 3. The contiguous surfaces to the liquid crystal 1 are covered with a pair of oriented films 5 and 5'.

Figure 2:
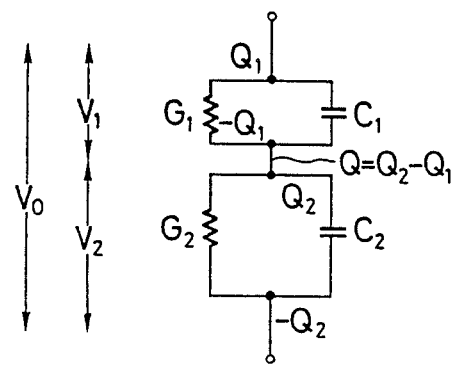
FIG. 2 is an equivalent circuit of a liquid crystal device according to the invention.

FIG. 2 is an equivalent circuit of the device. In the figure, $G_1$ and $C_1$ are the conductance and the capacitance of the dielectric film 2 and $G_2$ and $C_2$ are the conductance and the capacitance of the liquid crystal layer 1. If a voltage Vo is applied across the device, the following equation is satisfied at $t=0$:

$$Vo = V_1 + V_2,$$

$$V_1 = C_2 Vo/(C_1 + C_2),$$

$$V_2 = C_1 Vo/(C_1 + C_2).$$

where $V_1$ and $Q_1$ are the voltage across the dielectric film 2 and the charge accumulated on the dielectric film 2 and $V_2$ and $Q_2$ are the voltage across the liquid crystal layer 1 and the charge accumulated on the liquid crystal layer 1.

The thickness of the dielectric film 2 is less than 2000 Å whereas the thickness of the liquid crystal layer 1 is about 2 to 3 microns, so that $C_1 \gg C_2$ is satisfied. Hence, at the initial state, almost all the voltage is applied to the liquid crystal layer 1, namely $V_2 \approx Vo$.

Further, the charge Q accumulated on the floating electrode 6 at a time t (sec) is obtained by the equation:

$$Q = Vo(C_2 G_1 - C_1 G_2)/(G_1 + G_2) \times [1 - \exp{-t(G_1 + G_2)/(C_1 + C_2)}]$$

In a case where the thicknesses of the liquid crystal layer and the dielectric film are 2 microns and 1000° respectively and the area of one pixel is 100 microns×300 microns, the resistance of liquid crystal layer per pixel is on the order of $10^9$ ohm whereas the resistance of the dielectric film per pixel is on the order of $10^{13}$ ohm, whereby $G_1$ can be neglected in comparison with $G_2$. Taking the assumption of $C_1 \gg C_2$ and $G_1 \approx 0$ into consideration, the preceding equation can be rearranged as:

$$Q = -VoC_1 \times [1 - \exp(-tG_2/C_1)] = Q_2 - Q_1.$$

and also obtained are:

$$V_1 = Q_1/C_1,$$

$$V_2 = Q_2/C_2,$$

$$V = V_1 + V_2 = Q_1/C_1 + Q_2/C_2,$$

$$Q = C_1 V_1 - C_1 Vo \times [1 - \exp{-t(G_2/C_1)}]$$
$$= C_2(Vo - V_1),$$

$$V_1(C_1 + C_2) = C_2 Vo + C_1 Vo - C_1 Vo \exp{-t(G_2/C_1)},$$

$$V_1 = Vo - C_1 o/(C_1 + C_2) \times \exp{-t(G_2/C_1)},$$

When a sufficient time has elapsed, $V_1 = Vo$ is satisfied.

Namely, at the initial state, almost all the voltage is applied to the liquid crystal layer and, thereafter, almost all the voltage is applied to the dielectric film in turn.

On the process, a certain charge is accumulated on the floating electrode.

As a result, even if liquid crystal possesses only a faint coersive field itself, the substantial coersive field is determined by the charge accumulated on the floating electrode between the liquid crystal layer and the dielectric film. By virtue of the substantial coersive field, the liquid crystal layer eventually comes to possess an apparent large coersive field which can be controlled together with the preparation condition of the dielectric film.

Figure 4:
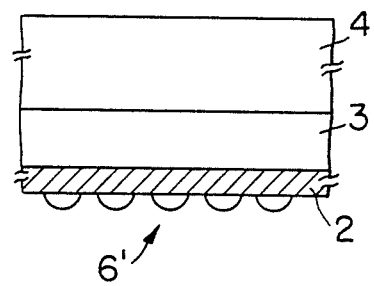
FIG. 4 is a partial cross-section view of a cluster embodiment of a floating electrode in accordance with the invention.

Next, a manufacturing process of the embodiment will be described in detail. The transparent electrodes 3 and 3' are formed of indium titan oxide on the glass substrates 4 and 4'. On the electrodes 3 the dielectric film 2 is formed from a ferroelectric material. Namely, a mixture of vinylidene fluoride (VDF) and trifloroethylene (TrFE) diluted with metyl-ethyl-keton at 10 weight % can be used. The copolymer solution is coated on the electrode 3 by a spinner to form the dielectric film whose thickness can be controlled by selecting the rotation frequency of the spinner and the density of the solution. Then the solvent is vaporized and removed by heating. The floating electrode 6 is formed of indium tin oxide (ITO) in the form of a layer or cluster (electrically isolated island-like conductors (as shown at 6' in FIG. 4) with 10 to 1000 Å in diameter) by sputtering. In experimental, the average diameter of cluster was 30 to 300 Å with the average thickness of 10 to 200 and, when ITO was deposited by sputtering to the average thickness of 200 to 2000 Å, the floating electrode was formed in a thin film. In case of the floating electrode in the form of a thin film, it must be severed into a plurality of pixels.

Further, the film 5 is formed on the contiguous surface of the floating electrode to the liquid crystal layer, using 1.1.1.trimethyl-silasane. The film 5 is not treated with rubbing. The other film 5' is composed of an aluminium film and a nylon film which has been treated with rubbing.

Finally the periphery of the coupled substrates is sealed off and ferroelectric liquid crystal is disposed therebetween. The liquid crystal may be a blend of S8 and B7. Other examples of ferroelectric liquid crystal are disclosed in Japanese Patent Published Applications Nos. 56-107216, 59-98051 and 59-118744.

As a result, a matrix of pixels with 1 mm×1 mm in size is formed. In experimental, a clear coersive electric field has been exhibited in response to voltages of ± applied to the device, which has never seen in prior art devices according to silan coupling agents.

Figure 3:
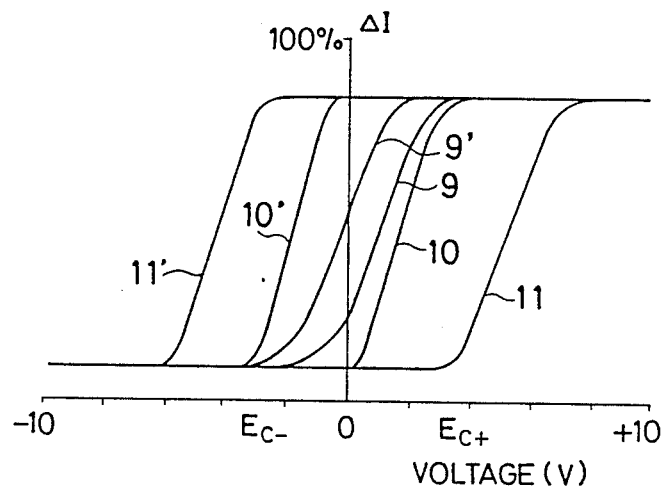
FIG. 3 is a graphical view showing hysteresis loops of a prior art device and embodiments of the invention.

FIG. 3 is a graphical diagram showing hysteresis loops of liquid crystal devices. The ordinate is a transmissivity and the abscissa is an applied voltage. In the figure, curves 9 and 9' show the hysteresis loop of a prior art device with no floating electrode and with a silan coupling agent on the upper electrode thereof. The coersive field tends to fluctuate around a very small value. Curves 10 and '10 show the hysteresis loop of an embodiment of the invention in which the dielectric film is a silicon nitride ($Si_3N_4$) film with 600 Å in thickness and the floating electrode is a ITO film with 400 Å in thickness. Curves 11 and 11' show the hysteresis loop of the embodiment described hereinbefore in detail.

While the above description has been made to show particular embodiments, many modifications will occur to those skilled in the art. In what follow some examples are described.

Instead of preparation of an oriented film, a shearing method is effective in devices according to the invention. Namely a liquid crystal layer can be oriented by slightly displacing one substrate respective to the other. Also, a temperature graduation method can be used alone or in combination with a rubbing method.

As an oriented film a ferroelectric film can be formed on the contiguous surface of the floating electrode so that the ferroelectric film is materially in contact with the liquid crystal layer. The ferroelectric film and the floating electrode may be formed in the same shape as the underlying electrode strip or in the form of cluster distributed throughout or partially on the electrode.

The invention is also applicable for speakers, printers or other devices in which is utilized the anisotropy of smectic liquid crystal.

What is claimed is:

1. A liquid crystal device comprising:
   first and second substrates, at least one of which is transparent;
   a liquid crystal layer disposed between said substrates;
   first and second electrodes respectively formed on the inside surfaces of said first and second substrates where said first and second electrodes are opposed to each other in order to define a plurality of pixels such that at each pixel an electric field may be applied through the liquid crystal layer;
   at least one floating electrode in each said pixel, each floating electrode being substantially closer to its associated first electrode than its associated second electrode; and
   a ferroelectric thin film made of an organic material comprising fluorine and electrically isolating said floating electrode and said first electrode.

2. A device of claim 1 wherein said organic material is a copolymer of vinylidene fluoride and trifluoroethylene.

3. A device of claim 2 wherein said ferroelectric film is formed on the inside of one of said electrodes.

4. A device of claim 1 wherein said electrodes are electrode strips orthogonally arranged on the opposed insides of the substrates.

5. A device of claim 3 wherein one of said substrates is a transparent substrate with at least one of said electrode being formed of transparent material.

6. A device as in claim 1 where the surface area of each said floating electrode is substantially as large as the cross sectional area of its associated pixel.

7. A device as in claim 1 where said floating electrode is a cluster of electrically isolated island-like conductors.

* * * * *